United States Patent
Marron et al.

(10) Patent No.: US 10,331,543 B2
(45) Date of Patent: Jun. 25, 2019

(54) PERFORMANCE DIAGNOSTICS VIA OFFLINE REPLAY

(71) Applicant: Microsoft Technology Licensing, LLC, Redmond, WA (US)

(72) Inventors: Mark Marron, Redmond, WA (US); Arunesh Chandra, Sammamish, WA (US); Todd Douglas Mytkowicz, Redmond, WA (US); Hitesh Kanwathirtha, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 150 days.

(21) Appl. No.: 15/406,483

(22) Filed: Jan. 13, 2017

(65) Prior Publication Data

US 2018/0203786 A1 Jul. 19, 2018

(51) Int. Cl.
*G06F 11/36* (2006.01)

(52) U.S. Cl.
CPC ...... *G06F 11/3636* (2013.01); *G06F 11/3664* (2013.01)

(58) Field of Classification Search
CPC ............. G06F 11/3664; G06F 11/3636; G06F 11/3688; G06F 11/3684; G06F 11/3692; G06F 11/3624; G06F 11/3612; G06F 11/3466; G06F 11/3476; G06F 11/3616
See application file for complete search history.

(56) References Cited

U.S. PATENT DOCUMENTS

| 6,658,416 | B1* | 12/2003 | Hussain | G06F 11/3466 |
| 7,458,078 | B2* | 11/2008 | DeWitt, Jr. | G06F 11/3636 712/225 |
| 7,895,588 | B2* | 2/2011 | Rossmann | G06F 11/366 717/127 |
| 8,955,114 | B2* | 2/2015 | Dolan-Gavitt | G06F 11/3414 726/22 |
| 9,129,058 | B2* | 9/2015 | Cui | G06F 11/3466 |
| 9,983,978 | B1* | 5/2018 | Mola | G06F 11/3636 |
| 2004/0015879 | A1* | 1/2004 | Pauw | G06F 11/3466 717/127 |
| 2005/0222689 | A1* | 10/2005 | Smith | G06F 11/3495 700/1 |
| 2010/0088682 | A1* | 4/2010 | Inakoshi | G06F 11/3419 717/128 |
| 2012/0051229 | A1 | 3/2012 | Feldmann et al. | |
| 2012/0060142 | A1 | 3/2012 | Fliess et al. | |
| 2013/0160128 | A1* | 6/2013 | Dolan-Gavitt | G06F 11/3414 726/25 |

(Continued)

OTHER PUBLICATIONS

Lee, et al., "Offline Symbolic Analysis for Multi-Processor Execution Replay", In Proceedings of the 42nd Annual IEEE/ACM International Symposium on Microarchitecture, Dec. 12, 2009, pp. 564-575.

(Continued)

*Primary Examiner* — Nadeem Iqbal
(74) *Attorney, Agent, or Firm* — Merchant & Gould (57) ABSTRACT

Methods and systems for performance measurements of a program are provided. An execution trace of the program may be captured and stored. The stored execution trace may be replayed in an offline mode. Performance measurements for the program may be determined based on the replaying of the execution trace in the offline mode.

20 Claims, 9 Drawing Sheets

(56) References Cited

U.S. PATENT DOCUMENTS

| | | | |
|---|---|---|---|
| 2014/0115403 A1 | 4/2014 | Rhee et al. | |
| 2015/0150138 A1* | 5/2015 | Dolan-Gavitt | G06F 11/3414 726/25 |
| 2015/0234730 A1* | 8/2015 | Puthuff | G06F 11/3636 717/128 |
| 2016/0011955 A1 | 1/2016 | Tsai et al. | |

OTHER PUBLICATIONS

Burg, et al., "Interactive record/replay for web application debugging", In Proceedings of the 26th annual ACM symposium on User interface software and technology, Oct. 8, 2013, pp. 473-484.

Fahs, et al., "Performance characterization of a hardware mechanism for dynamic optimization", In Proceedings of the 34th annual ACM/IEEE international symposium on Microarchitecture, Dec. 1, 2001, pp. 16-27.

Odaira "Efficient Runtime Tracking of Allocation Sites in Java", In Proceedings of the 6th ACM SIGPLAN/SIGOPS International conference on Virtual execution environments, Mar. 17, 2010, pp. 109-120.

"IntelliTrace", https://msdn.microsoft.com/en-us/library/dd264915.aspx, Retrieved on: Nov. 3, 2016, 5 pages.

"Offline Checkpoints", http://answers.perforce.com/articles/KB/2419/, Retrieved on: Nov. 3, 2016, 3 pages.

"Oracle Diagnostics Pack", https://docs.oracle.com/cd/E63000_01/OEMLI/db_mgmt.htm, Retrieved on: Nov. 3, 2016, 5 pages.

Chilimbi, et al., "Low-overhead memory leak detection using adaptive statistical profiling", In Proceedings of the 11th International conference on Architectural support for programming languages and operating systems, Oct. 9, 2004, pp. 156-164.

"Possible to Add "Offline Profiling" Functionality to My Application", http://stackoverflow.com/questions/33910842/possible-to-add-offline-profiling-functionality-to-my-application, Retrieved on: Nov. 3, 2016, 2 pages.

Jovic, et al., "Catch Me If You Can: Performance Bug Detection in the Wild", Proceedings of the 2011 Acm International Conference on Object Oriented Programming Systems Languages and Applications, Oct. 22, 2011, 2 pages.

Barr, et al., "Time-travel debugging for JavaScript/Node.js", In Proceedings of the ACM International Symposium on be Foundations of Software Engineering, Nov. 7, 2016, 5 pages.

"ChakraCore", https://github.com/Microsoft/ChakraCore, Retrieved Date: Nov. 7, 2016, 3 pages.

Georges, et al., "Java Performance Evaluation through Rigorous Replay Compilation", In Proceedings of the 23rd ACM SIGPLAN conference on Object-oriented programming systems languages and applications, Oct. 19, 2008, 18 pages.

Mytkowicz, et al., "Producing wrong data without doing anything obviously wrong!", In Proceedings of the 14th International conference on Architectural support for programming languages and operating systems, Mar. 7, 2009, pp. 265-276.

Mytkowicz, et al., "Evaluating the accuracy of java profilers", In Proceedings of the 31st ACM SIGPLAN Conference on Programming Language Design and Implementation, Jun. 5, 2010, pp. 187-197.

Bond, et al., "Bell: bit-encoding online memory leak detection", In Proceedings of the 12th international conference on Architectural support for programming languages and operating systems, Oct. 21, 2006, 12 pages.

\* cited by examiner

FIG. 1

```
1   var thing = null;
2
3   var thingUpdate = function () {
4       if(thing) thing.used(thing.msg);
5       var captured = thing;
6
7   thing = {
8       unused: function () {
9           if(captured)  captured.used('hi');
10      },
11      used: function (greeting) {
12          console.log(greeting);
13      },
14      msg: 'hello' + ' ' + 'world'
15  };
16  };
17
18  setInterval(thingUpdate, 1000);
```

Memory Use Inspector

Allocation Site Tree

▼ Line 7, static object thing, 1000 live
　▲ Line 3 thingUpdate
　　Node Internal Code setTimeout
▲ Line 8, function object unused, 1000 live
▲ Line 11, function object used, 1000 live
　▲ Line 3 thingUpdate
▲ Line 14, string msg, 1000 live

Identified Issues

Likely memory leak: Allocation site captured in closure chain created by function unused on line 8.

Snapshot : {URI, Rnd, Roots, Code, Types, Vals, Objs}
URI : URI of root .js file
Rnd : Seed for PNRG – obviates recording each value
Roots : [vID, ...]
Code : [codeId, ...]
Types : [{tyoeId, protoId, jsKind, flags, [SlotInfo ...]}, ...]
SlotInfo : {pid, attrib}
Vals : [{vId, jsKind, data}, ...]
Objs : [{vId, tyepId, Slots, ObjData ...}, ...]
Slots : Array of void*, interpreted using tag bits
ObjData : Pointer to data specific to builtin type

PERFORMANCE DIAGNOSTICS VIA OFFLINE REPLAY

BACKGROUND

Discovering and diagnosing non-functional memory use defects in software services is a major challenge facing developers. Memory leaks or poor memory utilization scenarios may only be seen infrequently or once a service is in production and, as users are actively using the service, it can be virtually impossible to halt the service to attach a debugger. This makes it very difficult to resolve underlying issues and instead these issues are often worked around indirectly, for example, where memory leaks are solved by rebooting servers.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to methods and systems for determining performance measurements for a program via an offline replay. An execution trace of the program may be captured and stored. The stored execution trace may be replayed in an offline mode. Performance measurements for the program may be determined from the offline replay. For example, during the offline replay, temporal information including memory allocation site call stacks and structural information of the program may be tracked. A set of heuristic checks may be run on the tracked information to determine one or more causes of memory leaks and poor memory use. The determined causes for memory leaks and poor memory uses may be provided to a user.

Examples are implemented as a computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage medium for determining performance measurements for a program. The performance measurements are provided by recording a trace of a program in production mode and then, offline, replaying the recorded execution trace. For example, a full-fidelity execution trace of the program in production mode may be recorded. The recorded execution trace may be replayed in an offline mode with additional allocation and memory monitoring features enabled. During the offline replay, temporal information including memory allocation site call stacks and structural information of the program may be tracked. A set of heuristic checks may be run on the tracked information to search one or more causes of memory leaks and poor memory use. The searched causes for memory leaks and poor memory uses may be presented to a user. The user may be provided with additional information such as extracted object allocation and root path information needed to triage, investigate, and resolve the issues. Determining performance measurements via offline replay may address at least two aspects of the scenario that makes diagnosis challenging for a user. First, issues which appear in production may be captured for analysis by the user and these issues may be reproduced as many times as needed to determine a cause through repeated replay. Second, the offline replay may enable the user to inspect the program execution with a debugger or run additional diagnostics without impacting other users being serviced by the program in a production mode.

Figure 1:
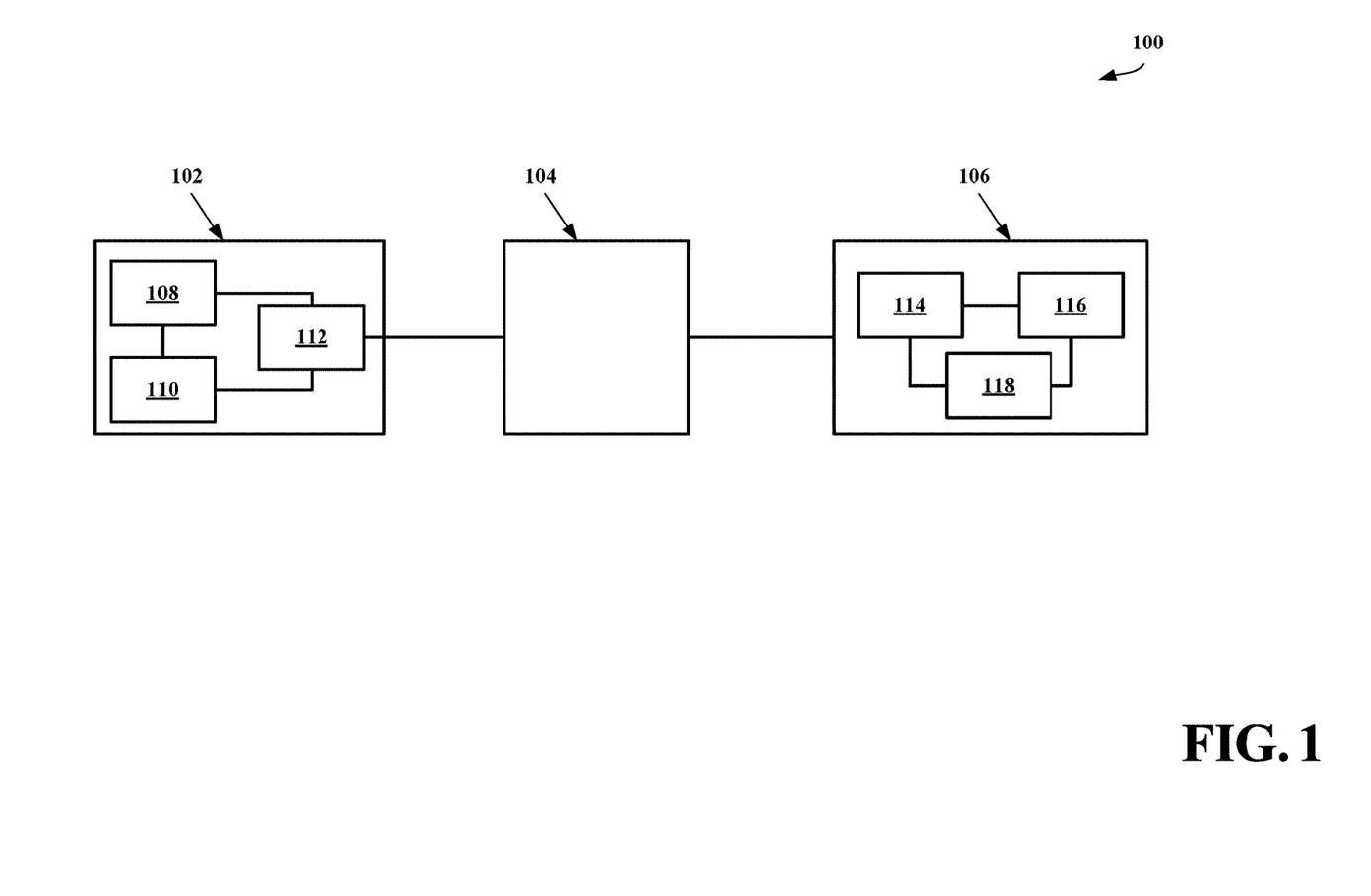
FIG. 1 is a block diagram showing a diagnostic system for determining performance measurements for a program.

FIG. 1 illustrates an example diagnostic system 100 for determining performance measurements for a program. Example diagnostic system 100 may include a first device 102, a second device 104, and a third device 106. First device 102 may be a computer system. For example, first device 102 may be one of various types of computing devices e.g., a tablet computing device, a desktop computer, a mobile communication device, a laptop computer, a laptop/tablet hybrid computing device, a large screen multi-touch display, a gaming device, a smart television, or other type of computing device. The hardware of these computing devices is discussed in greater detail in regard to FIGS. 6, 7A, 7B, and 8.

Figure 2:
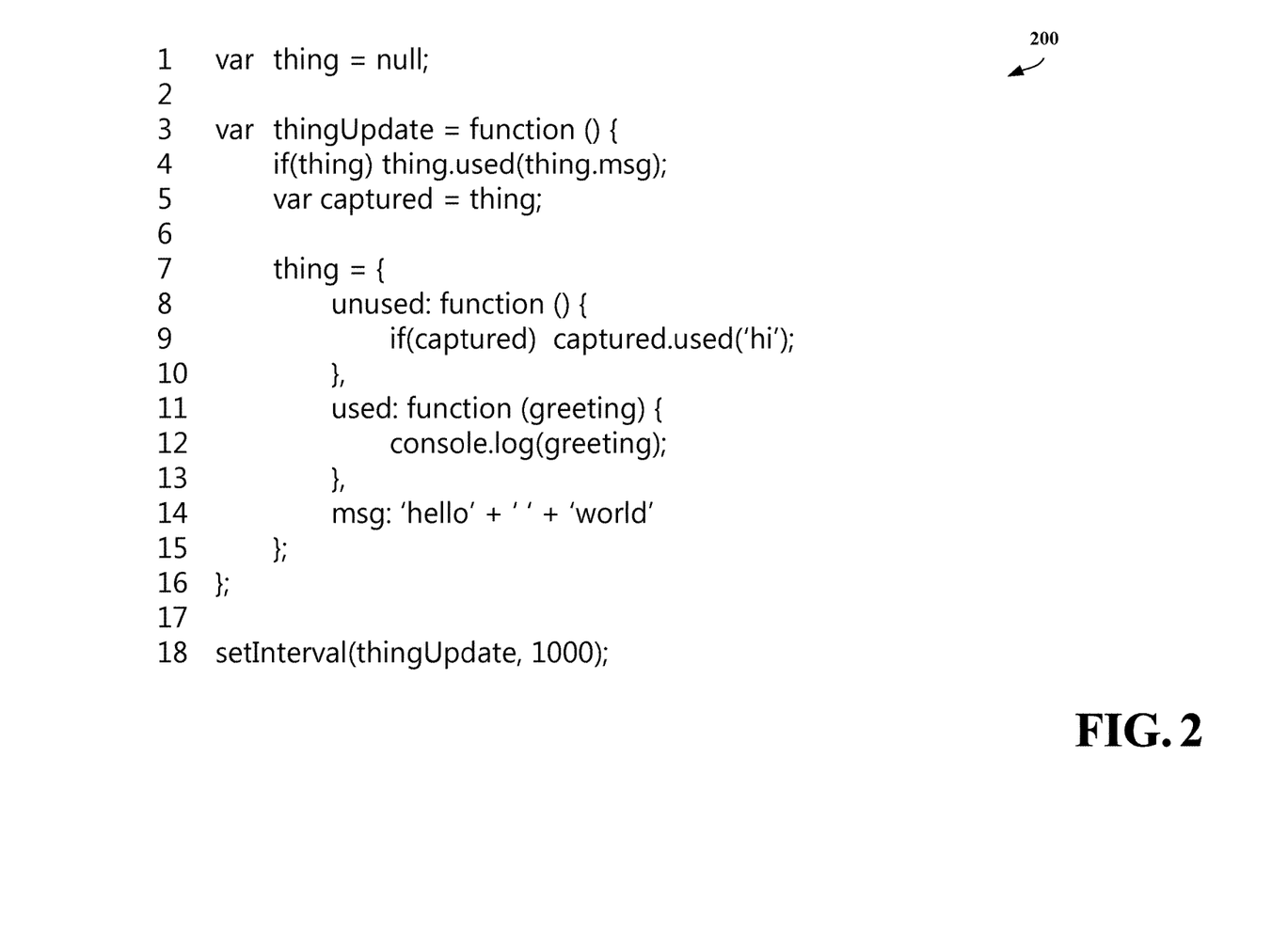
FIG. 2 is an illustration of an example program with a memory leak.

First device 102 may include a program 108, a trace application 110, and a ring buffer 112. For example, first device 102 may include program 108 executing on first device 102 in a production mode. An example of program 108 is shown in FIG. 2. Trace application 110 may be installed on first device 102 to record execution traces of program 108. Trace application 110 may be a thick client application, stored locally on first device 102, or may be a thin client application (i.e., a web application) that resides on a remote server and is accessible over a network. For example, a thin client trace application 110 may be hosted in a browser-controlled environment or coded in a browser-supported language and reliant on a common web browser to render trace application 110 executable on first device 102. Trace application 110 may be enabled to generate an execution trace of program 108 in ring buffer 112. For example, trace application 110 may generate a replay log which may be gathered at very low overhead. In one aspect, trace application 110 may capture one or more snapshots of program 108.

Ring buffer 112 may be a memory device configured to store a predetermined amount of execution traces. For example, ring buffer 112 may include a circular buffer having a circular queue data structure that uses a single fixed size buffer as if it were connected end-to-end. Ring buffer 112 may be enabled to erase and rewrite (or overwrite) the execution trace in a cyclic manner. For example, ring buffer 112 may store a first execution trace corresponding to a first time period, erase the first execution trace upon receiving a second execution trace for a second time period, and store the second execution trace in place of the first execution trace. A size of ring buffer 112 may be preconfigured by a user, and may depend on a length of time period of the execution trace. For example, the size may correspond to keeping two to ten (2-10) seconds of the execution trace. Trace application 110 may be configured to detect a predetermined event during execution of program 108 and may store the execution trace present in ring buffer to second device 104.

Second device 104 may store the execution trace received from ring buffer 112. For example, second device 104 may be configured to store the execution trace on a permanent basis for replay by a user. Second device 104 may be a removable, a non-removable, or a network based storage device. For example, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device. In addition, second device 104 may be a cloud based storage device. Second device 104 may be accessible by first device 102 either directly as a peripheral device or over a network such as the Internet or an intranet.

Third device 106 may be configured to replay the execution trace stored in second device 104. For example, third device 106 may be one of various types of computing devices e.g., a tablet computing device, a desktop computer, a mobile communication device, a laptop computer, a laptop/tablet hybrid computing device, a large screen multi-touch display, a gaming device, a smart television, or other type of computing device. The hardware of these computing devices is discussed in greater detail in regard to FIGS. 6, 7A, 7B, and 8. In one aspect, the execution trace from first device 102 may be replayed on third device 106.

Third device 106 may include a replay engine 114, an analyzer 116, and a report generator 118. Replay engine 114 may re-execute program 108 to mimic original execution in the production mode. For example, replay engine 114 may use the execution trace from second device 104 to replay the execution of program 108 in an offline mode mimicking the execution in production. Second device 104 may be accessible by third device 106 either directly as a peripheral device or over a network such as the Internet or an intranet.

Figure 3:
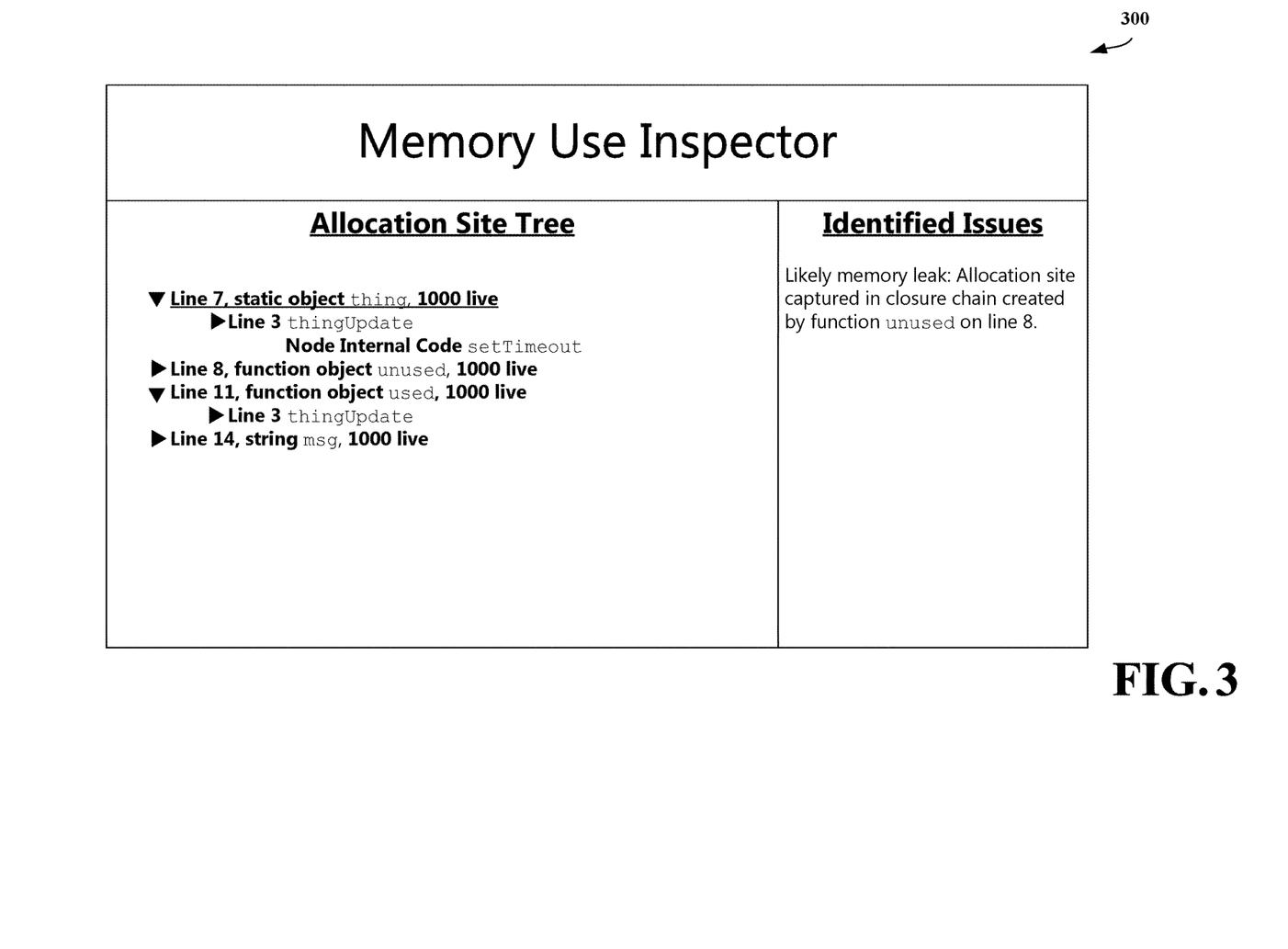
FIG. 3 is an illustration of an example of an output of an analyzer.

Analyzer 116 may collect information about memory allocation and leaks in program 108. For example, analyzer 116 may track temporal information including memory allocation site call stacks and structural information of program 108. Analyzer 116 may run a set of heuristic checks run on the tracked information to search one or more causes of memory leaks and poor memory use. Report generator 118 may provide results from the analysis of the offline replay and snapshots in the execution trace. For example, report generator 118 may present performance diagnostics of program 108 including the searched causes for memory leaks and poor memory uses to a user along with additional information such as extracted object allocation and root path information needed to triage, investigate, and resolve the issues. The generated performance diagnostics may be provided on a display screen accessible to the user. An example of a performance diagnostic result is illustrated in FIG. 3.

FIG. 2 is an illustration of an example program 108 with a memory leak. Program 108 may be a representative JavaScript application program designed to provide one or more services to one or more users. As should be appreciated, the example JavaScript program illustrated in FIG. 2 is for purposes of example only and is not limiting of other application program types with which aspects of the present disclosure may be utilized. For example, techniques disclosed herein may be implemented on programs written in managed languages such as Java, C#, Python, and with adjustments for memory models to unmanaged languages such as C and C++. In another example, program 108 may be an electronic mail (Email) application, calendaring application, word processing application, spreadsheet application, slide presentation application, notes taking application, a games application, and the like. Example program 108 may include a memory leak due to unintended closure capture of local variables. In JavaScript, local variables that are referenced in functions that escape a current scope may be captured in a closure scope. For example, in example program 108, illustrated in FIG. 2, a captured variable may be used in an unused function which escapes as part of a newly constructed thing object even though this function will never be invoked. Further, as the unused function captures the captured variable, which is the object created on the previous invocation of the thingUpdate function, it in essence may be creating a linked list of captured and leaked scope data. As example program 108 executes, it may continue to consume more memory as time goes on until it eventually causes an out-of-memory (OOM) exception.

Diagnostic system 100 may provide an efficient and effective workflow for performance measurements of example program 108. For example, diagnostic system 100 may eliminate a need to reproduce a behavior of example program 108 when the OOM exception occurs. The behavior may include, for example, user actions on example program 108 when the OOM exception occurs. In addition, diagnostic system 100 may provide a richer set of information for a program developer to use when investigating the OOM exception. Moreover, diagnostic system 100 may automatically diagnose and determine common sources of memory leaks such as the closure based leak in example program 108. For example, to diagnose memory leaks of example program 108, a user may run trace application 110, to generate a replay log which may be gathered at very low overhead. When the OOM exception occurs, trace application 110 may write out approximately the last n seconds of the execution trace information to ring buffer 112 which may then be provided as part of the error report to the second device 104. The execution trace may allow the program developer to deterministically replay the error automatically, thus eliminating a need to manually reproduce the OOM exception.

During the replay from the execution trace the program developer may enable heavyweight allocation call-site tracking which may gather additional information about memory allocation behavior of example program 108 and allocation call-stack of every object created during the replay. For example, analyzer 116 may run a set of heuristic checks on the gathered information to search one or more causes of memory leaks and poor memory use. FIG. 3 shows an example output 300 of analyzer 116. The example output 300 may be referred to as a web-based inspector output 300 for example program 108. The web-based inspector output 300 of diagnostic system 100 for example program 108 may show a number of objects allocated and a total size per allocation site. A program developer may expand information for any call site to get a refined list showing numbers of calls and total memory associated with various call-paths to that allocation site.

For example, when analyzer 116 is loaded, it may take allocation information as well as a snapshot of the heap provided by trace application 110 to determine performance measurements. Using automated leak check heuristics, analyzer 116 may scan graph structure and allocation information for common memory leak patterns and poor memory utilization behaviors that may be reported to the developer. For example, FIG. 3 illustrates a closure leak in example program 108 automatically detected by analyzer 116. In a report, analyzer 116 may provide additional information on the nature of the issue it has identified such as line numbers of related variables and suggestions for common fixes. The additional information may be provided in an additional information field or a menu in the report. For example, and as illustrated output 300 of FIG. 3, analyzer 116 may be able to automatically identify the memory leak, the relevant line numbers and variables corresponding to the leak, as well as, suggest that the developer fix the error by refactoring the use of the captured variable in the unused function.

Figure 4:
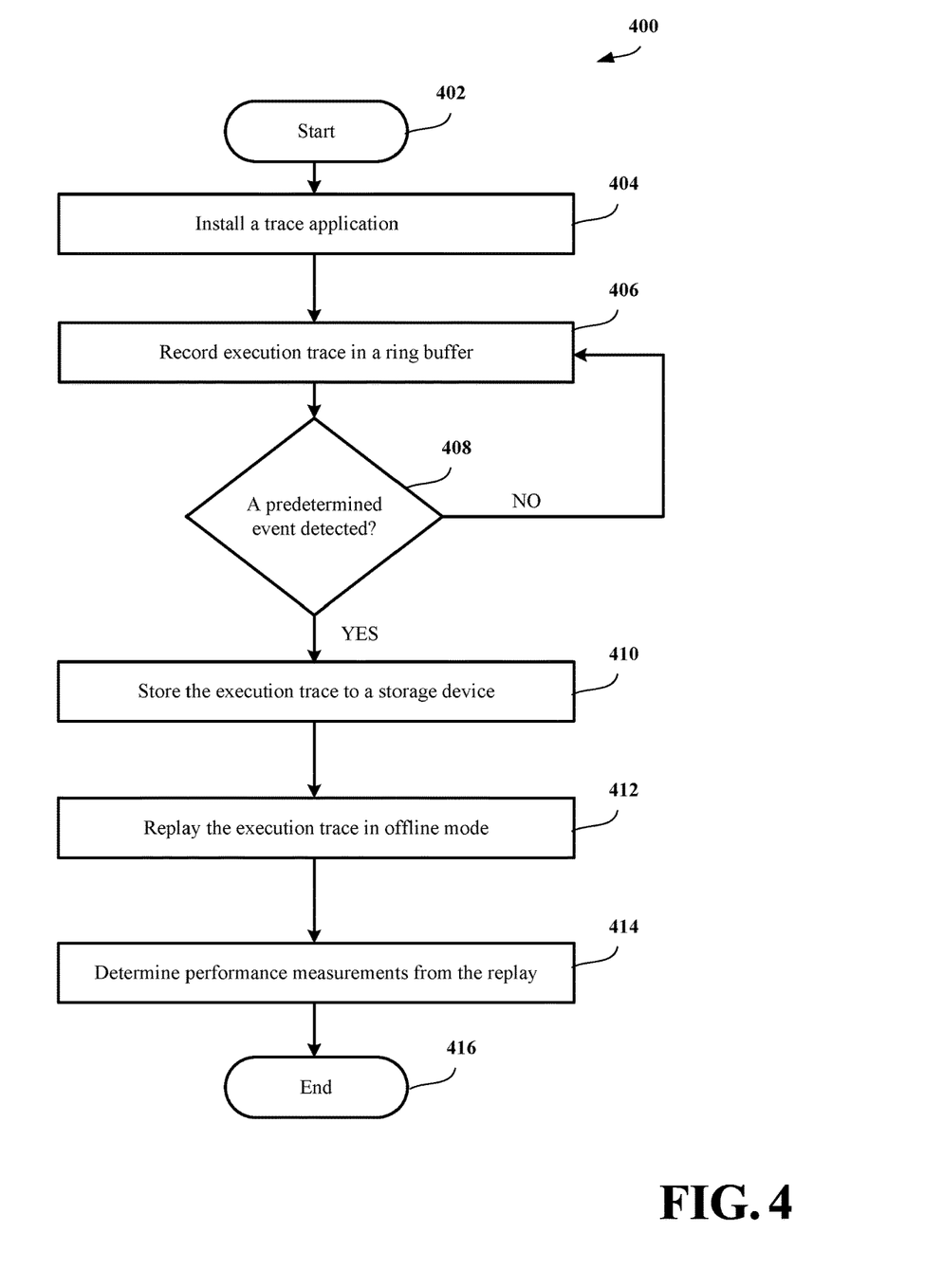
FIG. 4 is a flow chart showing general stages involved in an example method for providing performance measurements for a program.

FIG. 4 is a flow chart showing general stages involved in an example method 400 for determining performance measurements of program 108. Method 400 may begin at start OPERATION 402, and may proceed to OPERATION 404 where trace application 110 may be initiated. For example, trace application 110 may be initiated on first device 102 where program 108 is in executing in production mode. Trace application 110 may be installed in a record mode when deployed to users, given users consent. After initiating trace application 110 at OPERATION 404, method 400 may proceed to OPERATION 406 where trace application 110 may record an execution trace of program 108. For example, trace application 110 may continuously record the execution trace for a predetermined period in ring buffer 112. Trace application 110 may also record the execution trace in response to a request to record the execution trace. In addition to the execution trace, trace application 110 when initiated may also record snapshots of program 108.

To record the execution trace, a developer simply may invoke trace application 110 with a command. The command may include, for example, a command line such as flag, TTRecord: [uri], where the uri parameter indicates a location (a file or a remote server) to which to save the execution trace. By default, trace application 110 may continuously record approximately most recent n seconds (e.g., 2-10) of an execution trace in ring buffer 112. According to an aspect, an overhead of recording the execution trace may be under 5% of memory. This overhead is low enough to continuously keep on the last 2-10 seconds of execution trace and dump the execution trace to second device 104 when a performance issue is detected.

Figure 5:
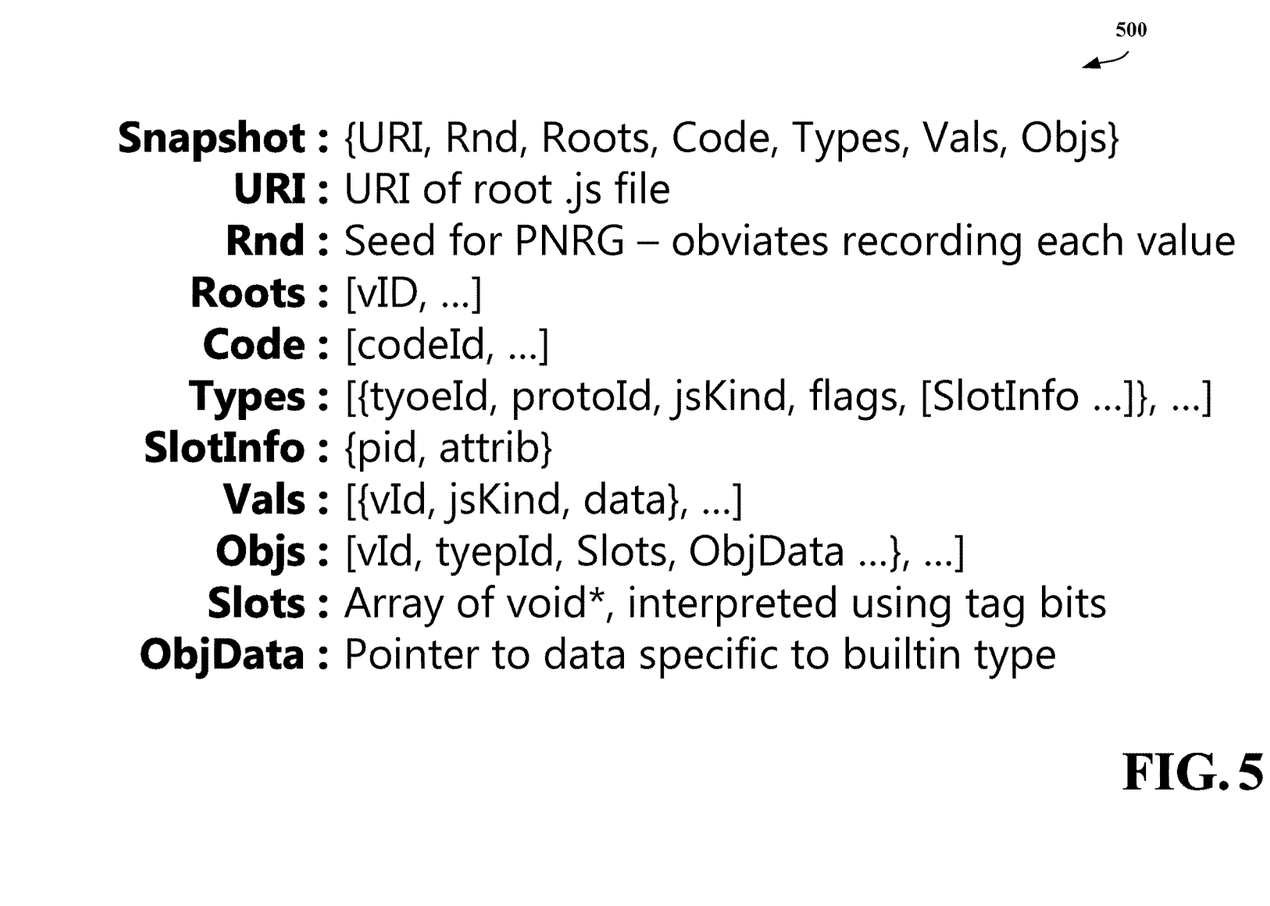
FIG. 5 is an illustration of an example of a snapshot representation of a program.

In addition to recording the execution trace, trace application 110 may also extracts snapshots as illustrated in FIG. 5. FIG. 5 illustrates an example snapshot representation 500. Example snapshot representation 500 may include, for example, live objects of a program, pointer relations between these objects, and data values these objects contain. In addition, example snapshot representation 500 may provide structural and logical views of the objects. For example, the structural and logical view of JavaScript objects may be used by analyzer 116 to compute a memory impact of each of the objects created in the program and the connectivity relations between various objects in the heap.

To provide the most precise and useful information possible, trace application 110 may be configured to track full call-stacks, as opposed to simple allocation lines, as the context for object allocations. For example, as the program executes, trace application 110 may keep track of a call-stack tree mapping from allocation call-stacks to a number of times allocation occurred at a call-site and a weak-set of all the allocated objects that are still live for the call-site. An example of data definitions include:

```
1 struct CallSiteStats
2 {
3 size_t allocCount;
4 WeakSet<Object*> liveAllocs;
5};
6
7 Struct Location
8 {
9 Char* sourceFile;
10 size_t line;
11 size_t column;
12};
13
14 union PathEntry
15 {
16 map <Location, PathEntry*> pathOpt;
17 CallSiteStats dataOp t;
18};
19
20 PathEntry pathRoots;
```

In this example of data definitions, each program location that contains an allocation operation may become a path root. From this statement the PathEntry objects may form a tree data-structure where the child nodes correspond to a caller program location. Hence, this example of data definitions may provide a compact path layout where call-stacks with common prefixes share parts of the tree. This example of data definitions may also simplify later aggregation operations. For example, computing how many objects are allocated at a given location, regardless of callers, may become an allocation on a subtree for the location.

For example, after recording the execution trace at OPERATION 408, method 400 may proceed to OPERATION 410 where it may determine whether a predetermined event has occurred. For example, trace application 110 may determine whether an OOM exception has occurred during execution of program 108. In response to detecting occurrence of the predetermined event, method 400 may proceed to OPERATION 410 where the execution trace may be sent to a storage device. For example, upon detecting an OOM exception, trace application 110 may send the execution trace from ring buffer 112 to second device 104.

After storing the execution trace on a storage device at OPERATION 410, method 400 may proceed to OPERATION 412 where the execution trace may be replayed. For example, replay engine 114 may replay the execution trace in an offline mode. During the replay, the developer may load and re-execute the execution trace by invoking replay engine 114 with, for example, a TTReplayHost [uri] command. According to an aspect, during the replay from the execution trace, the developer may enable heavyweight allocation call-site tracking which may gather additional information about memory allocation behavior and allocation call-stack during the replay. For example, replay engine 114 may execute the execution trace with the additional instrumentation.

For example, to determine the allocation site information, replay engine 114 may extend a -TTReplay mode with an additional -MemTrace flag that may switch on an allocation call-site tracing. Replay engine 114 may execute based on a bytecode representation and provide an interpreter as well as a just in time (JIT) compiler that can execute this bytecode. For example, for each bytecode that allocates an object, an array, or a primitive string, the developer may update the allocation call-site tracking code to track the allocation. According to an aspect, an update of the allocation call-site tracking code may be performed by walking the call-stack filling out the path in a PathEntry tree, starting from a line where the allocation occurs, and then either creating a new CallSiteStats entry if this is the first allocation for the path or updating the count and set as follows:

```
1    StackWalker walker ( interpreterStack ) ;
2    Location& line = walker . CurrentFrame ( ) ;
3    PathEntry* path = pathRoots . pathOpt [ line ] ;
4
5    walker. moveUp ( ) ;
6    while ( walker . isValid ( ) )
7    {
8        Location& line = walker . CurrentFrame ( ) ;
9        if ( ! path . contains ( line ) ) {
10           if ( walker . isTop ( ) ) {
11               CallSiteStats stats = { 0 }];
12               path . pathOpt . add ( line , stats ) ;
13           }
14           else {
15               auto e = new map<Location , PathEn t r y*>( ) ;
16               path . pathOpt . add ( line , e ) ;
17           }
18       }
19       currPath = pathRoots . pathOpt [ currLine ] ;
20   }
21
22   currPath . dataOp t . allocCount ++;
23   currPath . dataOpt . liveAl locs . add ( obj ) ;
```

At the end of the replay of the execution trace, the developer, through the allocation call-site tracking code, may record a total number of allocations for each call-stack and may access all objects which may still live in the liveAllocs weak sets. This recorded data may be sufficient to compute object allocation and origin statistics. In addition, replay engine 114 may provide a snapshot from trace application 110 and may provide the allocation tree data so that the developer may correlate object structure with memory used and allocation sites during the analysis.

After replaying the execution trace at OPERATION 412, method 400 may proceed to OPERATION 414 where performance measurements may be provided. For example, analyzer 116 may analyze data from replay engine 114 and snapshots from trace application 110, and determine memory related measurements. Analyzer 116 may look for two classes of memory related issues. A first class may be memory leaks, which eventually may lead to an OOM exception, while a second class may be focused on memory utilization issues that may not lead to the OOM exceptions but are very likely to cause degraded application performance. Although developers often focus on OOM exceptions which cause application failure, poor memory utilization may often be much harder to diagnose as symptoms are less acute and the sources may be much less obvious. Analyzer 116 may execute an automatic memory leak diagnosis. For example, analyzer 116 may execute the automatic memory leak diagnosis based one at least one of the following: a global object that dominates 5% or more of the memory and is not declared—accidental global; a global (or module scoped) collection that dominates 5% or more of the memory—failed cache management; a closure chain longer than ten memory lines and contains 5% or more—unintended closure; and a use request lifetime to automatically flag growing allocation sites (or something similar).

In one aspect, analyzer 116 may provide a memory utilization analysis. For example, analyzer 116 may inspect all memory allocation sites which consist of over 5% of the memory. Moreover, analyzer 116 may inspect all JavaScript specific poor memory health features including sparse array (which internally may use more memory—convert to dictionary) and objects with (big) dictionary handlers. In addition, analyzer 116 may further inspect allocation site objects with small number of properties that result in high memory use overheads. Moreover, analyzer 116 may inspect allocation site arrays with two or fewer elements or with under 50% memory utilization for high overhead collections.

The performance measurements collected at OPERATION 414 may be provided in a report. For example, the performance measurements may be provided on a web interface, or as a data file, or as feedback. In addition, one or more recommendations may be provided with the performance measurements. For example, recommendations may include at least one way to fix a memory leak or avoid an OOM exception. The recommendations may be provided in a form for alteration of the program code. Once the performance measurements are provided at OPERATION 414, method 400 may end at OPERATION 416.

While this disclosure is focused on offline profiling for memory analysis the core technique may be more general. For example, in contrast to much of the work on dynamic analysis techniques which must carefully trade runtime overhead for information that can be tracked, offline profiling may shift the checking work to an offline mode where additional runtime overhead may be of a minimal concern. This shift may enable developers to focus on the quality and utility of the results instead of the runtime overhead. Thus, the techniques disclosed herein may be effectively applied to a range of other dynamic analysis including runtime or type-state monitoring, heap-state checking, and dynamic data-flow analysis.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
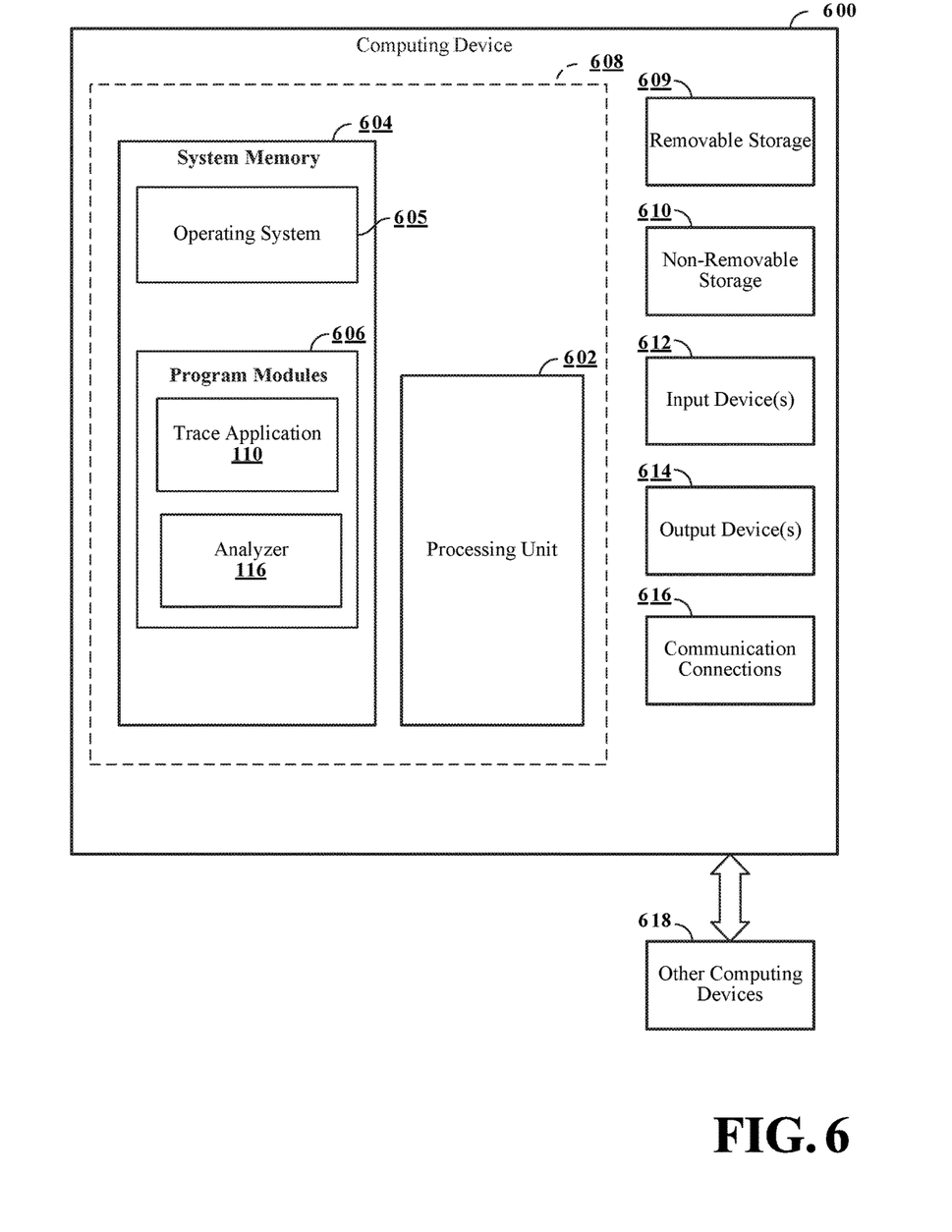
FIG. 6 is a block diagram illustrating example physical components of a computing device.
Figure 7A:
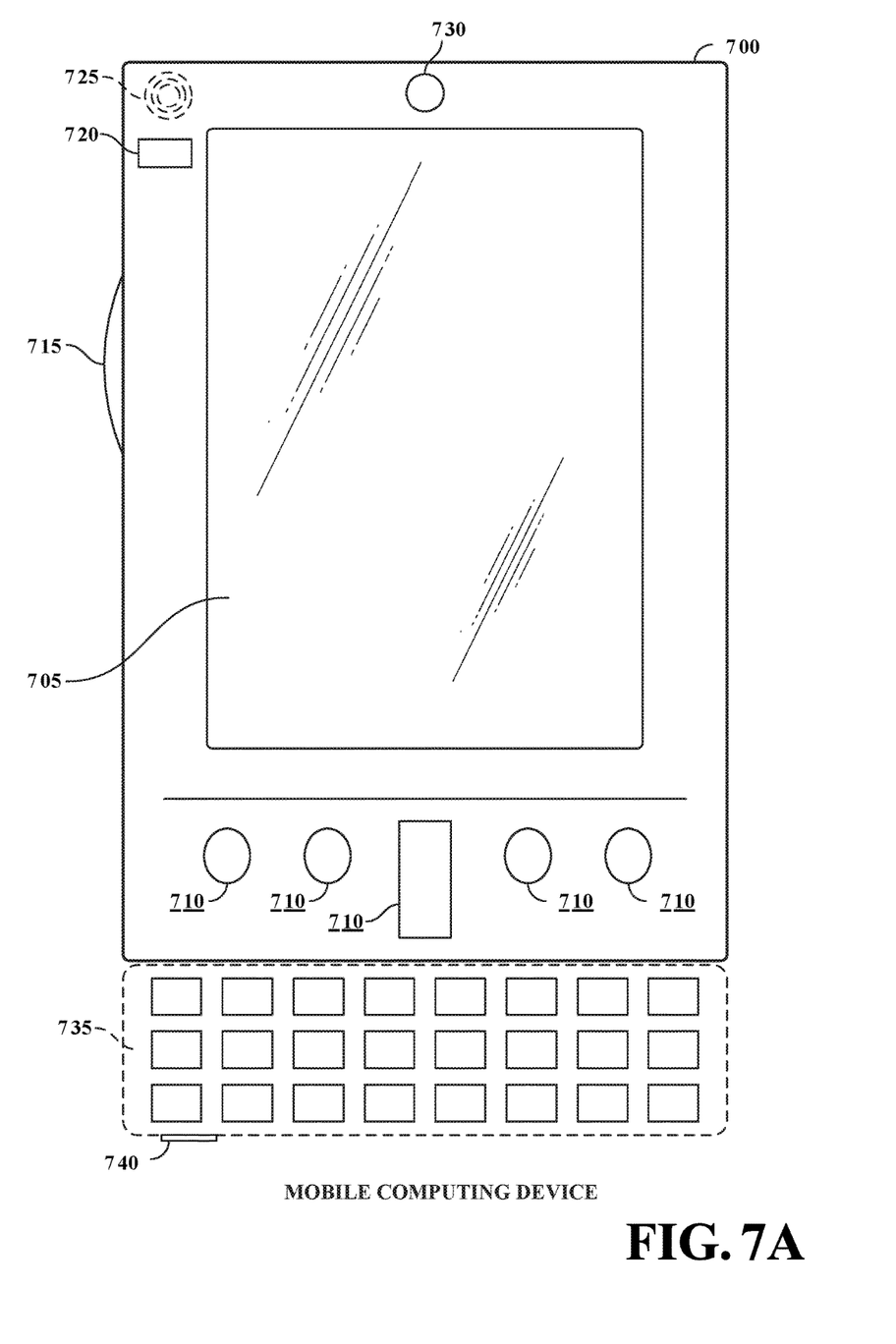
FIGS. 7A and 7B are block diagrams of a mobile computing device.
Figure 7B:
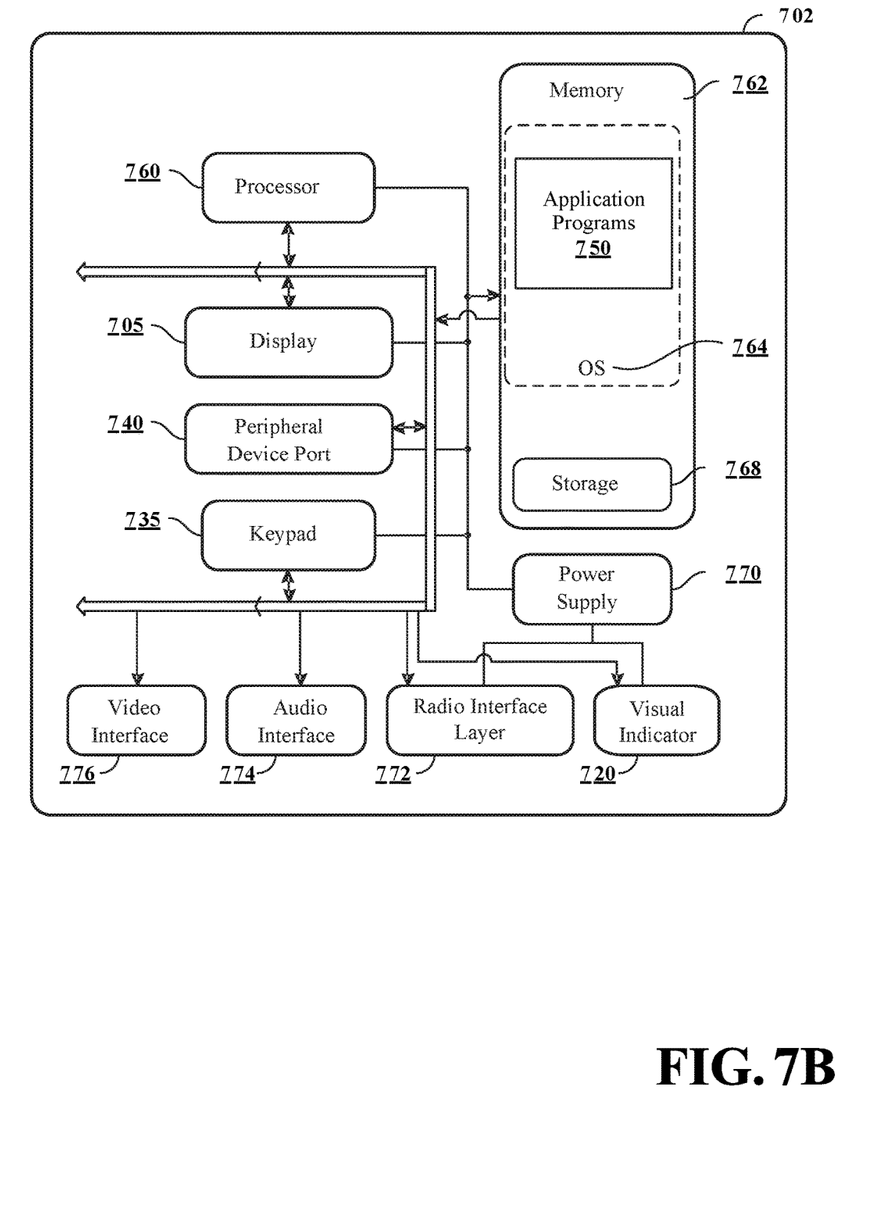
Figure 8:
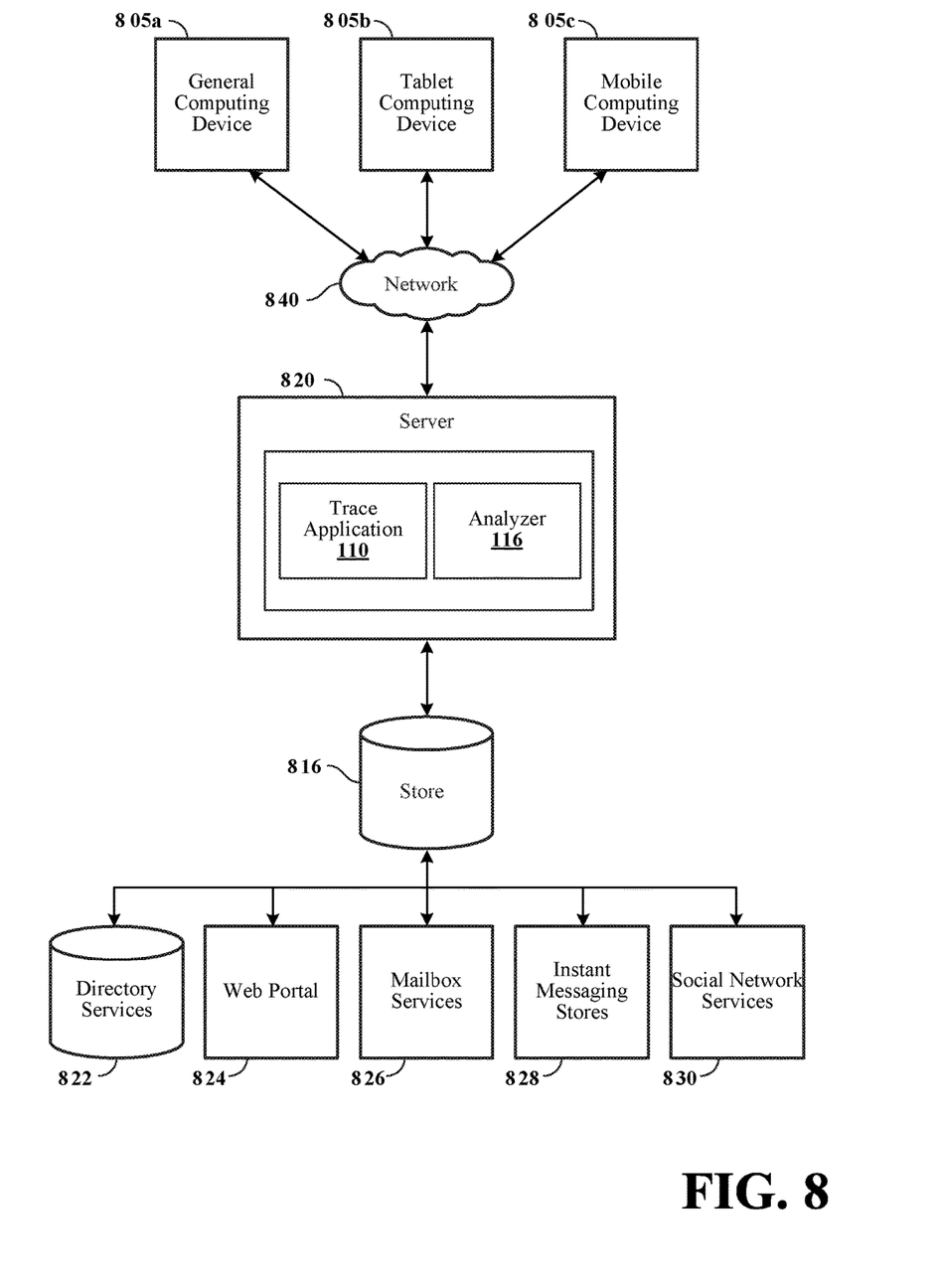
FIG. 8 is a block diagram of a distributed computing system.

FIGS. 6-8 and the associated descriptions provide a discussion of a variety of operating environments in which examples may be practiced. However, the devices and systems illustrated and discussed with respect to FIGS. 6-8 are for purposes of example and illustration and may not limit of a vast number of computing device configurations that may be utilized for practicing aspects, described herein.

FIG. 6 is a block diagram illustrating physical components (i.e., hardware) of a computing device 600 with which examples of the present disclosure may be practiced. In a basic configuration, computing device 600 may include at least one processing unit 602 and a system memory 604. According to an aspect, depending on the configuration and type of computing device, system memory 604 may include, but is not limited to, volatile storage (e.g., random access memory), non-volatile storage (e.g., read-only memory), flash memory, or any combination of such memories. According to an aspect, system memory 604 may include an operating system 605 and one or more program modules 606 suitable for running software applications 650. According to an aspect, system memory 604 may include trace application 110 and analyzer 116. Operating system 605, for example, may be suitable for controlling the operation of computing device 600. Furthermore, aspects may be practiced in conjunction with a graphics library, other operating systems, or any other application program, and is not limited to any particular application or system. This basic configuration is illustrated in FIG. 6 by those components within a dashed line 608. According to an aspect, computing device 600 may include additional features or functionality. For example, according to an aspect, computing device 600 may include additional data storage devices (removable and/or non-removable) such as, for example, magnetic disks, optical disks, or tape. Such additional storage is illustrated in FIG. 6 by a removable storage device 609 and a non-removable storage device 610.

As stated above, according to an aspect, a number of program modules and data files may be stored in the system memory 604. While executing on processing unit 602, program modules 606 (e.g., trace application 110 and analyzer 116) may perform processes including, but not limited to, one or more of the stages of the method 400 illustrated in FIG. 4. According to an aspect, other program module may be used in accordance with examples and may include applications such as electronic mail and contacts applications, word processing applications, spreadsheet applications, database applications, slide presentation applications, drawing or computer-aided application programs, etc.

According to an aspect, aspects may be practiced in an electrical circuit including discrete electronic elements, packaged or integrated electronic chips containing logic gates, a circuit utilizing a microprocessor, or on a single chip containing electronic elements or microprocessors. For example, aspects may be practiced via a system-on-a-chip (SOC) where each or many of the components illustrated in FIG. 6 may be integrated onto a single integrated circuit. According to an aspect, such an SOC device may include one or more processing units, graphics units, communications units, system virtualization units and various application functionality all of which are integrated (or "burned") onto the chip substrate as a single integrated circuit. When operating via an SOC, the functionality, described herein, may be operated via application-specific logic integrated with other components of computing device 600 on the single integrated circuit (chip). According to an aspect, aspects of the present disclosure may be practiced using other technologies capable of performing logical operations such as, for example, AND, OR, and NOT, including but not limited to mechanical, optical, fluidic, and quantum technologies. In addition, aspects may be practiced within a general purpose computer or in any other circuits or systems.

According to an aspect, computing device 600 may include one or more input device(s) 612 such as a keyboard, a mouse, a pen, a sound input device, a touch input device, etc. Output device(s) 614 such as a display, speakers, a printer, etc. may also be included according to an aspect. The aforementioned devices are examples and others may be used. According to an aspect, computing device 600 may include one or more communication connections 616 allowing communications with other computing devices 618. Examples of suitable communication connections 616 may include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. System memory 604, removable storage device 609, and non-removable storage device 610 may all be computer storage media examples (i.e., memory storage.) According to an aspect, computer storage media may include RAM, ROM, electrically erasable programmable read-only memory (EEPROM), flash memory or other memory technology, CD- ROM, digital versatile disks (DVD) or other optical storage, magnetic cassettes, magnetic tape, magnetic disk storage or other magnetic storage devices, or any other article of manufacture which can be used to store information and which can be accessed by computing device 600. According to an aspect, any such computer storage media may be part of computing device 600. Computer storage media may not include a carrier wave or other propagated data signal.

According to an aspect, communication media may be embodied by computer readable instructions, data structures, program modules, or other data in a modulated data signal, such as a carrier wave or other transport mechanism, and includes any information delivery media. According to an aspect, the term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a tablet personal computer, a laptop computer, and the like, with which aspects of the disclosure may be practiced. With reference to FIG. 7A, an example of a mobile computing device 700 for implementing the aspects is illustrated. In a basic configuration, mobile computing device 700 may be a handheld computer having both input elements and output elements. Mobile computing device 700 may typically include a display 705 and one or more input buttons 710 that allow the user to enter information into mobile computing device 700. According to an aspect, display 705 of mobile computing device 700 may function as an input device (e.g., a touch screen display). If included, an optional side input element 715 may allow further user input. According to an aspect, side input element 715 may be a rotary switch, a button, or any other type of manual input element. In alternative examples, mobile computing device 700 incorporates more or less input elements. For example, display 705 may not be a touch screen in some examples. In alternative examples, mobile computing device 700 may be a portable phone system, such as a cellular phone. According to an aspect, mobile computing device 700 may include an optional keypad 735. According to an aspect, optional keypad 735 may be a physical keypad. According to another aspect, optional keypad 735 may be a "soft" keypad generated on the touch screen display. In various aspects, the output elements may include display 705 for showing a graphical user interface (GUI), a visual indicator 720 (e.g., a light emitting diode), and/or an audio transducer 725 (e.g., a speaker). In some examples, mobile computing device 700 may incorporate a vibration transducer for providing the user with tactile feedback. In yet another example, mobile computing device 700 may incorporate input and/or output ports, such as an audio input (e.g., a microphone jack), an audio output (e.g., a headphone jack), and a video output (e.g., a HDMI port) for sending signals to or receiving signals from an external device. In yet another example, mobile computing device 700 may incorporate peripheral device port 740, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one example of a mobile computing device. That is, mobile computing device 700 may incorporate a system (i.e., an architecture) 702 to implement some examples. In one example, system 702 may be implemented as a "smart phone" capable of running one or more applications (e.g., browser, e-mail, calendaring, contact managers, messaging clients, games, and media clients/players). In some examples, system 702 may be integrated as a computing device, such as an integrated personal digital assistant (PDA) and wireless phone.

According to an aspect, one or more application programs 750 may be loaded into memory 762 and may run on or in association with operating system 764. Examples of the application programs may include phone dialer programs, e-mail programs, personal information management (PIM) programs, word processing programs, spreadsheet programs, Internet browser programs, messaging programs, and so forth. According to an aspect, program 108, trace application 110, analyzer 116 may be loaded into memory 762. System 702 may also include a non-volatile storage area 768 within memory 762. Non-volatile storage area 768 may be used to store persistent information that should not be lost if system 702 is powered down. Application programs 750 may use and store information in non-volatile storage area 768, such as e-mail or other messages used by an e-mail application, and the like. A synchronization application (not shown) also resides on system 702 and is programmed to interact with a corresponding synchronization application resident on a host computer to keep the information stored in non-volatile storage area 768 synchronized with corresponding information stored at the host computer. As should be appreciated, other applications may be loaded into memory 762 and run on mobile computing device 700.

According to an aspect, system 702 may include a power supply 770, which may be implemented as one or more batteries. According to an aspect, power supply 770 may further include an external power source, such as an AC adapter or a powered docking cradle that supplements or recharges the batteries.

According to an aspect, system 702 may include a radio 772 that may perform the function of transmitting and receiving radio frequency communications. Radio 772 may facilitate wireless connectivity between system 702 and the "outside world," via a communications carrier or service provider. Transmissions to and from radio 772 may be conducted under control of operating system 764. In other words, communications received by radio 772 may be disseminated to application programs 750 via operating system 764, and vice versa.

According to an aspect, visual indicator 720 may be used to provide visual notifications and/or an audio interface 774 may be used for producing audible notifications via audio transducer 725. In the illustrated example, visual indicator 720 may be a light emitting diode (LED) and audio transducer 725 may be a speaker. These devices may be directly coupled to power supply 770 so that when activated, they remain on for a duration dictated by the notification mechanism even though processor 760 and other components might shut down for conserving battery power. The LED may be programmed to remain on indefinitely until the user takes action to indicate the powered-on status of the device. Audio interface 774 may be used to provide audible signals to and receive audible signals from the user. For example, in addition to being coupled to audio transducer 725, audio interface 774 may also be coupled to a microphone to receive audible input, such as to facilitate a telephone conversation. According to an aspect, system 702 may further include a video interface 776 that may enable an operation of an on-board camera 730 to record still images, video stream, and the like.

According to an aspect, a mobile computing device 700 implementing system 702 may include additional features or functionality. For example, mobile computing device 700 may include additional data storage devices (removable and/or non-removable) such as, magnetic disks, optical disks, or tape. Such additional storage is illustrated in FIG. 7B by non-volatile storage area 768.

According to an aspect, data/information generated or captured by mobile computing device 700 and stored via the system 702 may be stored locally on mobile computing device 700, as described above. According to another aspect, the data is stored on any number of storage media that is accessible by the device via radio 772 or via a wired connection between mobile computing device 700 and a separate computing device associated with mobile computing device 700, for example, a server computer in a distributed computing network, such as the Internet. As should be appreciated such data/information is accessible via mobile computing device 700 via radio 772 or via a distributed computing network. Similarly, according to an aspect, such data/information is readily transferred between computing devices for storage and use according to well-known data/information transfer and storage means, including electronic mail and collaborative data/information sharing systems.

FIG. 8 illustrates one example of the architecture of a system for generating performance measurements of a program as described above. Content developed, interacted with, or edited in association with the program may be enabled to be stored in different communication channels or other storage types. For example, various documents may be stored using a directory service 822, a web portal 824, a mailbox service 826, an instant messaging store 828, or a social networking site 830. Diagnostic system 100 may be operative to use any of these types of systems or the like for providing performance measurement and diagnostic reports, as described herein. According to an aspect, a server 820 may provide the performance measurements of a program to clients 805*a,b,c*. As one example, the server 820 may be a web server providing the performance measurements of a program over the web. The server 820 may provide the performance measurements of a program over the web to clients 805 through a network 840. By way of example, the client computing device may be implemented and embodied in a personal computer 805*a*, a tablet computing device 805*b* or a mobile computing device 805*c* (e.g., a smart phone), or other computing device. Any of these examples of the client computing device may be operable to obtain content from the store 816.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for providing performance measurements for a program, the method comprising:
   receiving an execution trace of a program, the execution trace is continually recorded into a plurality of predetermined time intervals, wherein the execution trace for a time interval is stored for analysis when a performance issue is detected during the time interval;
   replaying the execution trace for the time interval in an offline mode; and
   determining performance measurements for the program from the replaying of the execution trace for the time interval.

2. The method of claim 1, wherein receiving the execution trace of the program comprises receiving the execution trace when the program is executing in a production mode.

3. The method of claim 1, wherein receiving the execution trace of the program comprises receiving the execution trace from a storage device, wherein the execution trace is stored on the storage device in response to an occurrence of a predefined event during execution of the program.

4. The method of claim 3, wherein the predefined event comprises an out of memory (OOM) exception.

5. The method of claim 1, wherein receiving the execution trace of the program comprises receiving the execution trace from a storage device, wherein the execution trace is stored on the storage device from a ring buffer, wherein the ring buffer is configured to temporarily store the execution trace for a predetermined time period.

6. The method of claim 5, wherein the ring buffer is configured to send the execution trace to the storage device in response to detecting a predetermined event.

7. The method of claim 1, wherein replaying the received execution trace comprises replaying the received execution trace on a second device which is different from a first device on which the program is executing in a production mode.

8. The method of claim 1, wherein replaying the execution trace comprises replaying the execution trace with a debugger attached to the execution trace, the debugger configured to detect the performance measurements of the program.

9. The method of claim 8, wherein replaying the received execution trace with the debugger attached to the execution trace comprises replaying the received execution trace with the debugger attached to track at least one of the following: memory lines, memory call-stacks, and memory counts.

10. The method of claim 1, wherein determining the performance measurements for the program comprises determining at least one of the following: memory leak and memory utilization.

11. The method of claim 1, wherein determining the performance measurements for the program comprises determining timing information of one or more input/output (I/O) operations of the program.

12. A system for providing performance measurements for a program, the system comprising:
   at least one processing device; and
   at least one computer readable data storage device storing instructions that, when executed by the at least one processing device, cause the system to:

receive an execution trace of a program executing on a first device, the execution trace is continually recorded into a plurality of predetermined time intervals, wherein the execution trace for a time interval is stored for analysis when a performance issue is detected during the time interval;

replay the execution trace on a second device for the time interval in an offline mode; and determine performance measurements of the program based on the replay of the execution trace for the time interval.

13. The system of claim 12, wherein the program is executing on the first device in a production mode providing service to at least one user.

14. The system of claim 12, wherein the determined performance measurements are provided to a developer.

15. The system of claim 12, wherein the execution trace is replayed on the second device with an attached diagnosis program configured to detect the performance measurements.

16. The system of claim 12, wherein the first storage device execution trace is received from a cloud based storage device, wherein the execution trace is stored on the cloud based storage device from a ring buffer.

17. The system of claim 16, wherein the execution trace is stored on the cloud based storage device from the ring buffer in response to detecting an out of memory (OOM) exception.

18. The system of claim 12, wherein the execution trace comprises at least one of the following: one or more objects, pointer relations between the one or more objects, and data values contained in the one or more objects.

19. A nonvolatile computer readable storage medium including computer readable instructions, which when executed by a processing unit are operative to:

receive an execution trace of a program executing on a first device in a production mode, the execution trace is continually recorded into a plurality of predetermined time intervals, wherein the execution trace for a time interval is stored for analysis when a performance issue is detected during the time interval;

replay the execution trace on a second device for the time interval in an offline mode;

determine performance measurements of the program based on the replay of the execution trace for the time interval; and provide the performance measurements to a program developer.

20. The nonvolatile computer readable storage medium of claim 19, wherein the performance measurements comprises a memory leak diagnosis.

* * * * *